May 29, 1956 — EMRULLAH ÂLI YILDIZ — 2,747,675
VARIABLE PITCH PROPELLER MECHANISM FOR WINGED AIRCRAFT
Filed Aug. 1, 1952 — 5 Sheets-Sheet 4
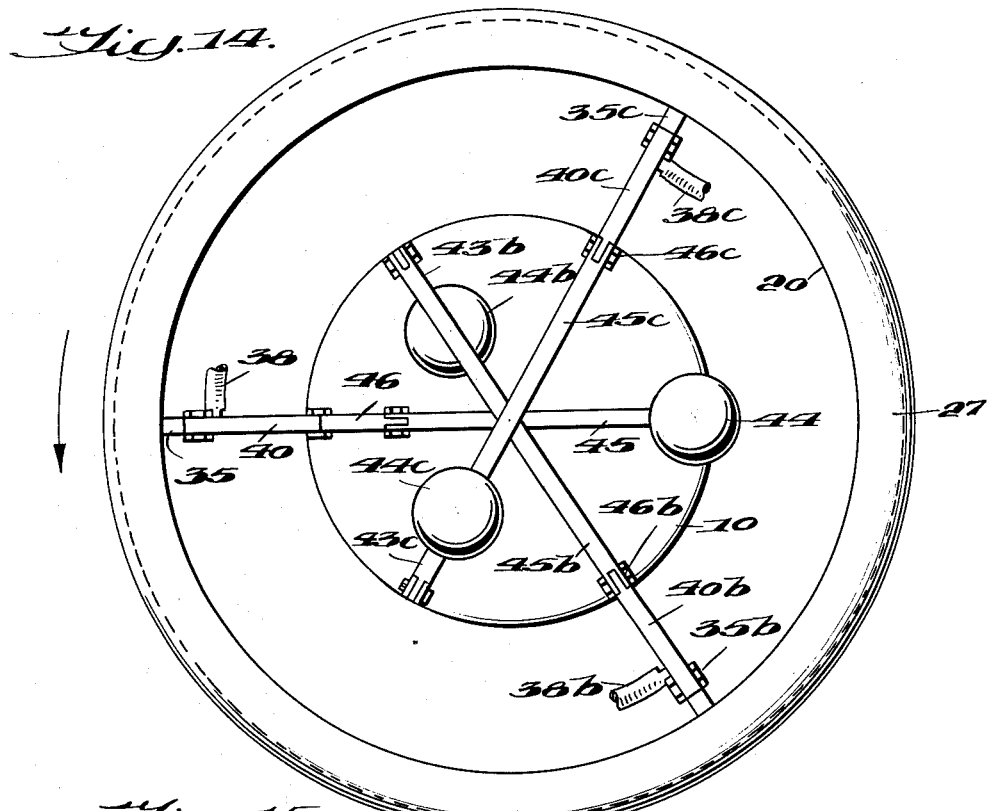
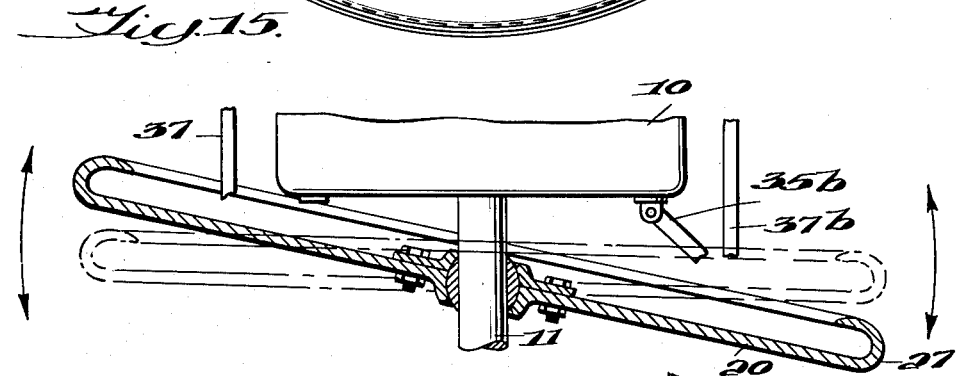
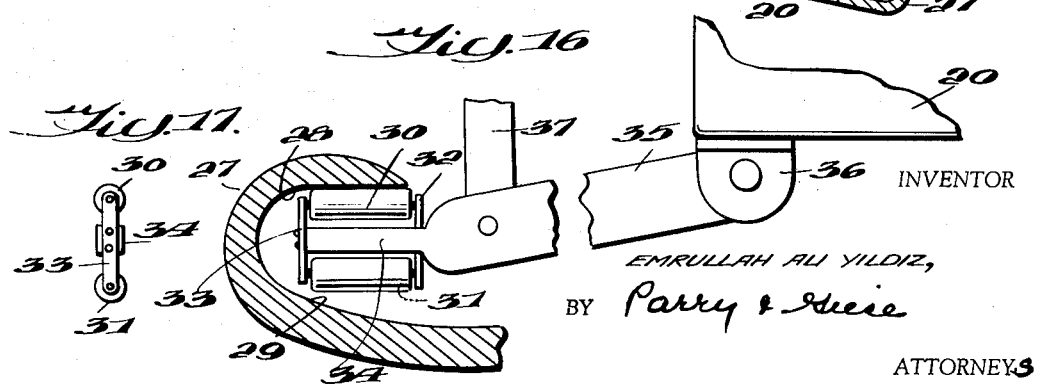
INVENTOR
EMRULLAH ALI YILDIZ,
BY Parry & Keere
ATTORNEYS

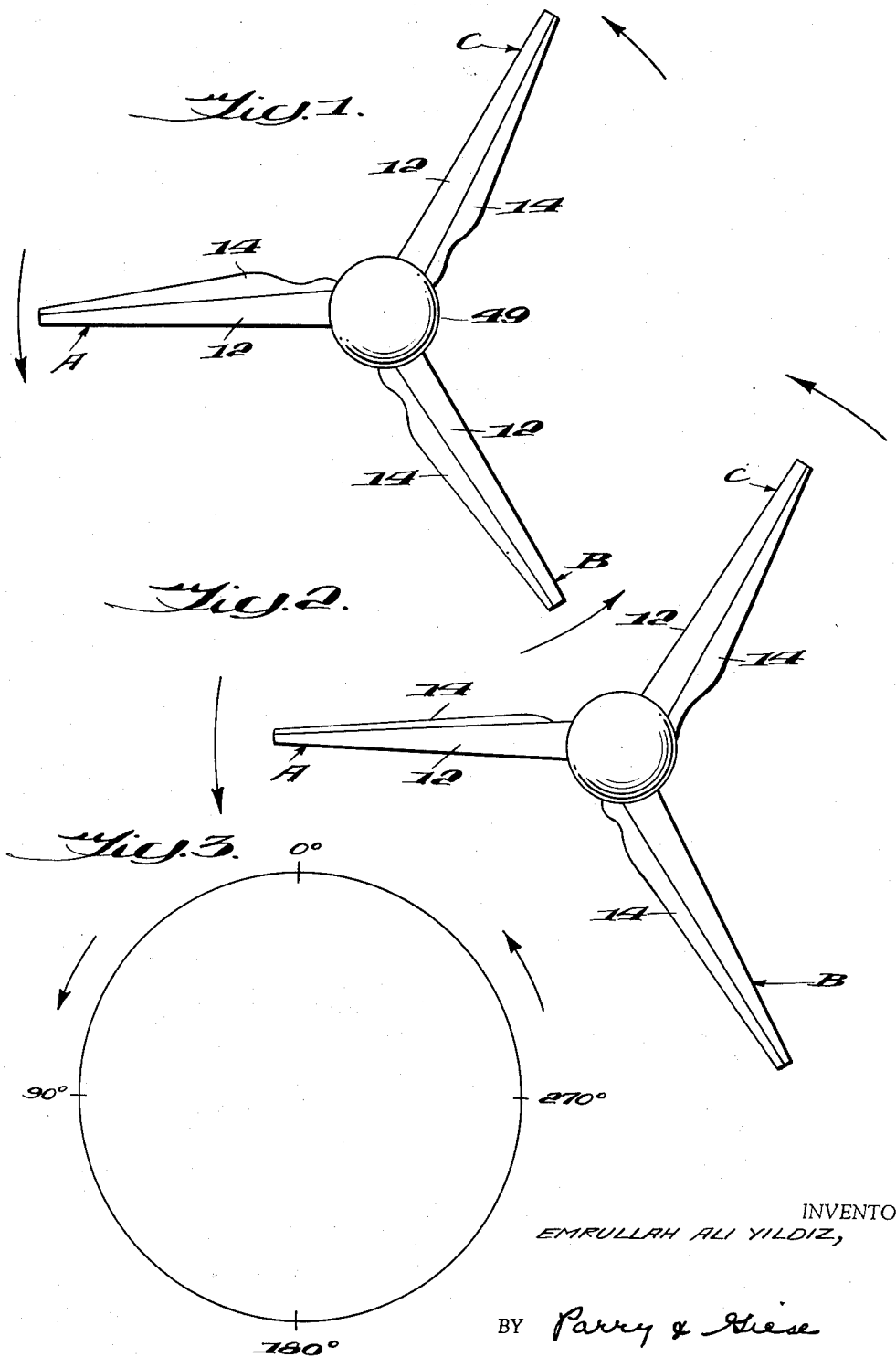

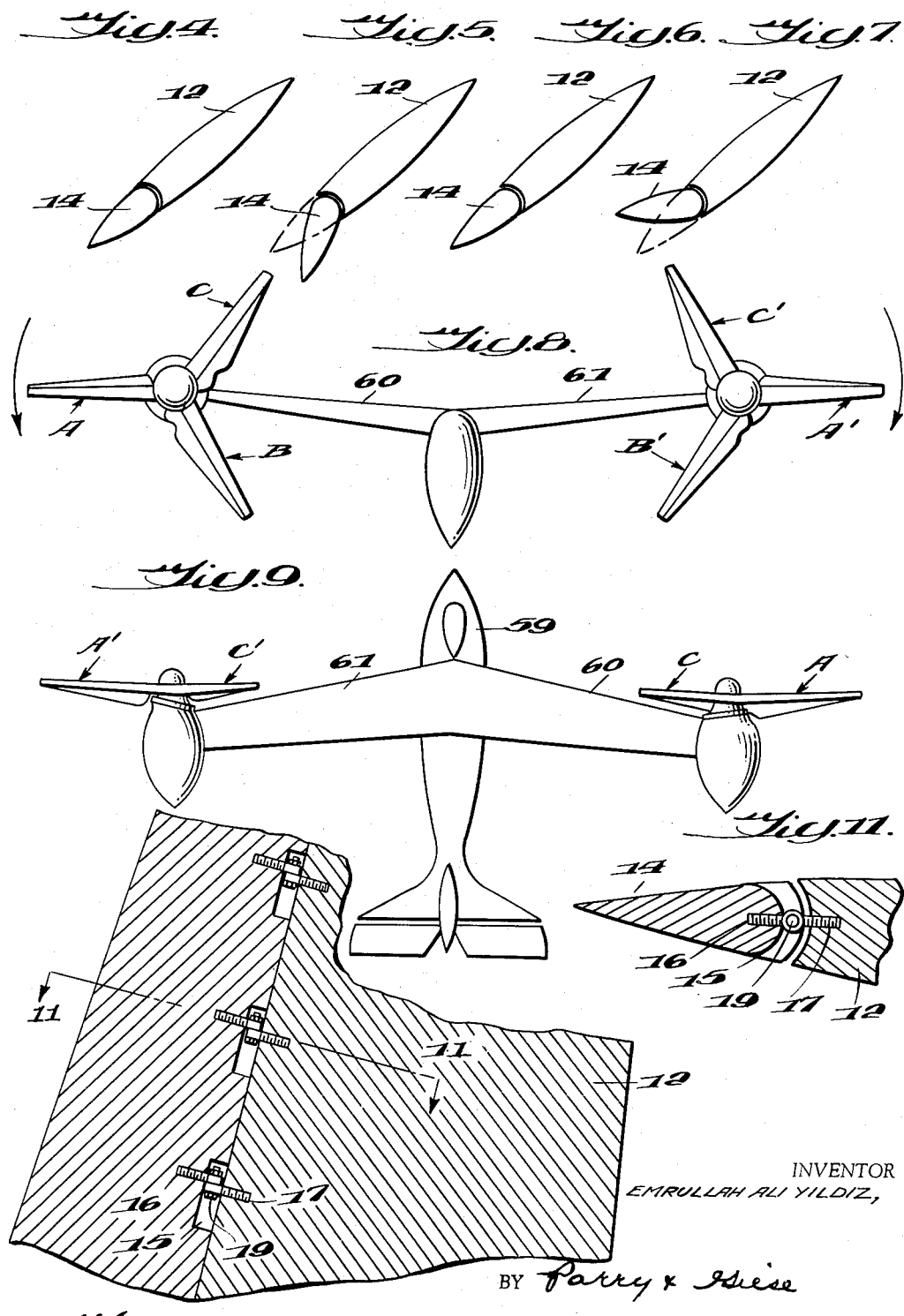

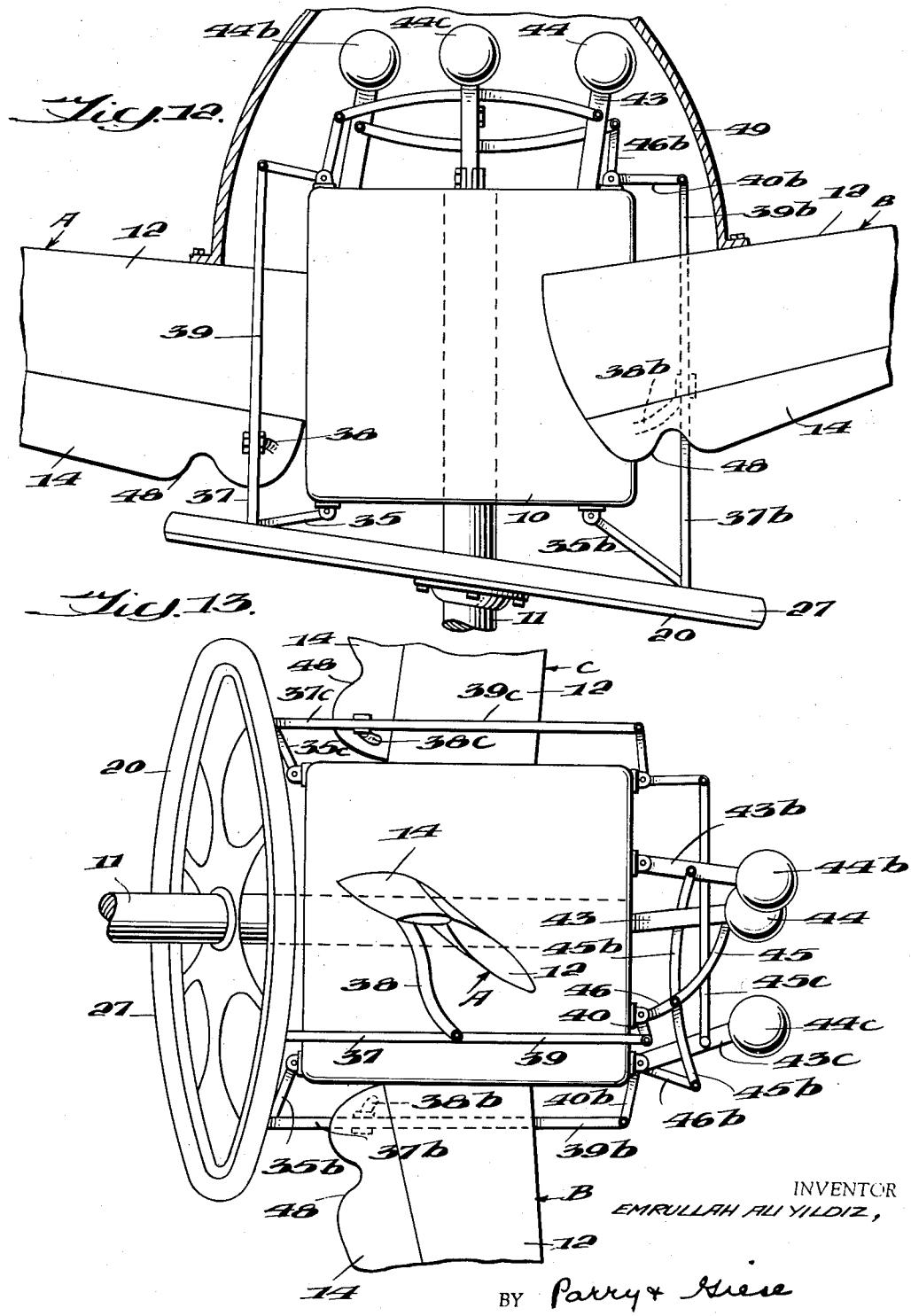

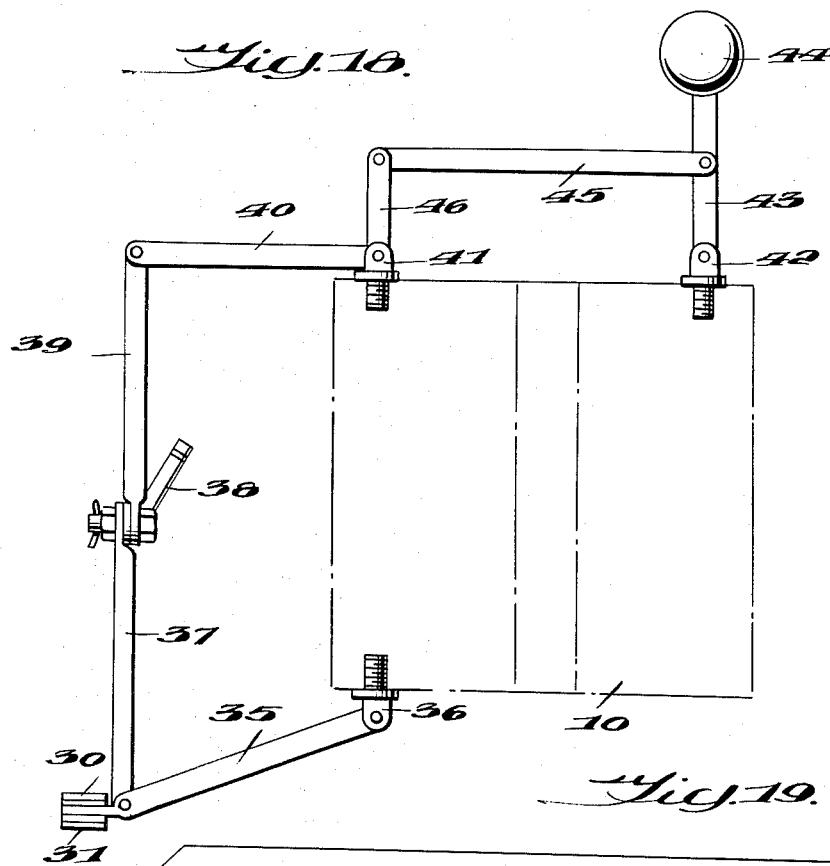
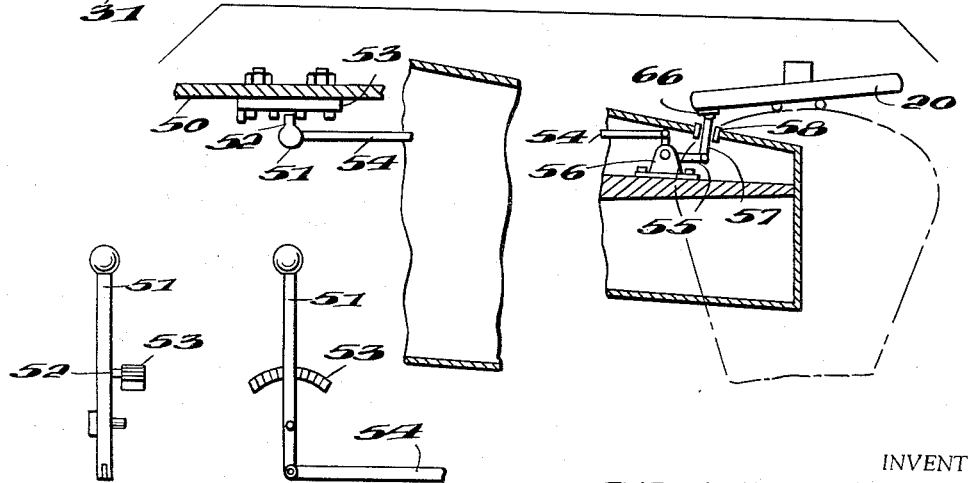

United States Patent Office 2,747,675
Patented May 29, 1956

2,747,675

VARIABLE PITCH PROPELLER MECHANISM FOR WINGED AIRCRAFT

Emrullah Âli Yildiz, Istanbul, Turkey

Application August 1, 1952, Serial No. 302,046

5 Claims. (Cl. 170—160.16)

This invention relates to improvements in variable pitch propeller mechanism for winged aircraft. It is particularly concerned with the conventional class of winged aircraft employing upright propellers rotating about transverse axes lengthwise of the aircraft.

One object of the invention is to provide improved variable pitch propeller mechanism adapted to provide lift to supplement the lift of the wings during inclined descent for landing. It is also an object of the invention to accomplish the same purpose during take-off.

A further object of the invention is to enable winged aircraft to operate at much lower and safer speeds during inclined descent in landing than possible with conventional variable pitch propeller mechanisms and wing flaps, and also to permit slower ground speed and shorter ground path after landing.

It is a further object of the invention to enable winged aircraft to ascend from take-off at slower speed than with conventional variable pitch propeller mechanism, but with increased effective propeller power.

A further object of the invention is to provide improved variable pitch propeller mechanism for winged aircraft wherein individual upright propeller blades are changed in pitch successively instead of simultaneously and in accordance with their rotative position. It is particularly proposed to increase the pitch of propeller blades during rotation downwardly and cause the blades to exert downward thrust and give additional lift.

It is a further object of the invention to cause propeller blades to operate at different pitches during rotation downwardly and upwardly.

Conventional adjustable pitch mechanism for aircraft propellers of the class referred to serve to vary the pitch of the propeller blades in unison. Changes in the pitch of all the blades is effected simultaneously for different flight conditions. The blades all operate at some same selected greater pitch during ascent and descent than their pitch during normal horizontal flight.

On the other hand, according to the present invention provision is made for automatically varying the pitch of the propeller blades individually so that each blade operates at different pitches in the course of rotation, in aircraft descent and/or ascent. Provision is further made for rotation of all propeller blades at a common pitch during normal horizontal flight. Provision is further made for varying the pitch of the propeller blades for all flight conditions under manual control of the aircraft pilot.

It is further contemplated to vary the pitch of aircraft propeller blades during the course of rotation without objectionable vibration effects. To this end it is proposed to employ multiple propellers and to rotate propellers on opposite sides of an aircraft about opposite rotational orbits. Two, four or other even number of propellers may thusly be operated.

It is further proposed to incorporate special means in conjunction with automatic pitch varying mechanism for preventing vibration from developing in such mechanism.

The foregoing and other objects and benefits of the invention will be understood from the accompanying drawings and the detailed description thereof to follow. In such drawings Fig. 1 is a front view of an aircraft propeller according to the invention with all the blades at the same pitch for normal horizontal flight;

Fig. 2 is a similar view of the same propeller with the pitch of the blades changing in different portions of their rotational orbit during aircraft descent and/or ascent;

Fig. 3 is a diagrammatic view of the transverse plane of rotation of a propeller according to the invention and indicating different portions of the rotational orbit;

Figs. 4, 5, 6 and 7 are diagrammatic views illustrating the different pitch of propeller blades at different portions of the rotational orbit of Fig. 3;

Fig. 8 is a more or less diagrammatic front view of an aircraft with multiple propeller mechanism according to the present invention;

Fig. 9 is a top plan view of the aircraft shown in Fig. 8;

Fig. 10 is a fragmentary longitudinal section of one form of variable pitch propeller blade according to the invention;

Fig. 11 is a transverse section of a variable pitch propeller blade taken at line 11—11 of Fig. 10;

Fig. 12 is a bottom plan view of automatic propeller pitch varying mechanism according to the invention;

Fig. 13 is a side elevation of the mechanism shown in Fig. 12;

Fig. 14 is a front view of the mechanism shown in Fig. 12, but with the propeller omitted;

Fig. 15 is a fragmentary top plan view of certain of the operating parts shown in Fig. 12;

Fig. 16 is an enlarged fragmentary view partly in section and partly in elevation of the cam track and associated parts;

Fig. 17 is an end view of the roller bearing mechanism shown in Fig. 18;

Fig. 18 is a plan view of the complete operating linkage for one blade of a propeller;

Fig. 19 is a somewhat diagrammatic top view partly in section of one form of manual control for adjusting the pitch varying mechanism;

Fig. 20 is a side elevation of the control arm shown in Fig. 19; and,

Fig. 21 is a front elevation of the control arm and associated parts.

The variable pitch propeller mechanism of the invention may be employed with propellers having two, three or more blades. For purposes of illustration I have selected three-bladed propellers. One of such propellers is shown in Figs. 1 and 2. The three blades thereof are generally designated A, B and C. As best shown in Figs. 12 and 13 such blades are mounted on a rotatable hub 10 secured to the forward end of rotatable propeller shaft 11. The rear of the shaft connects with any suitable type of driving motor, not shown.

Each of the propeller blades is formed in two sections which are hinged together along a substantially radial line. The forward or lead section 12 of each blade is rigidly mounted on hub 10 at a pitch suitable for normal horizontal flight. The angle of pitch may depend upon various factors such as the size of the blade, power of the motor and size and weight of the aircraft. A pitch angle of 45° is here taken for illustration. Each blade also includes a trailing flap section 14 which is variable in pitch in relation to section 12. Any suitable means may be employed for hinging the two blade sections together. As shown in Figs. 10 and 11 the forward edge of flap section 14 may be provided with a series of arcuate recesses 15 at recurrent longitudinal points. Anchored in such recesses are I-bolts 16. Similar I-bolts 17 are secured to the arcuate rear edge of front blade section 12. Hinge bolts 19 secure bolts 16 and 17 for hinging movement of flap section 14 relative to front section 12.

Preferably forward blade section 12 inclines slightly forwardly in the direction of rotation, say at an angle of 5°, and also tapers outwardly. See Figs. 1 and 2. Preferably flap section 14 also tapers in an outward direction. See Fig. 1.

In normal horizontal flight of an aircraft flap section 14 will be aligned with and have the same pitch as section 12. In Fig. 1 the sections of each of the blades A, B and C have the same constant pitch during normal horizontal flight, say 45°, as mentioned above. See also Fig. 4.

In descent for landing the flap section 14 of each propeller blade is progressively changed relative to front section 12 in the course of rotation thus changing the effective pitch of each entire blade. The essential purpose is to so increase the pitch of each flap section 14 during downward movement as to cause the air to be forced in a downward direction. Effective lift is thus produced to supplement the lift of the aircraft wings. For convenience, pitch angle is measured from the rotational plane of the propeller. When the pitch of flap section 14 is increased relative to such plane it increasingly decreases relative to the rotational axis.

At and near the top of the path of rotation, designated 0° in Fig. 3, each flap section 14 will be aligned with each of the front sections 12. See Fig. 4. As each blade rotates downwardly the pitch of each flap section 14 is progressively increased and will reach a maximum pitch at or about the time it is in the horizontal position designated 90° in Fig. 3. See Fig. 5. The amount of pitch increase will be subject to adjustment by the aircraft pilot to suit conditions. At maximum pitch each flap section 14 may have a pitch of as much as 75°, representing an increase of 30° from the pitch of front blade section 12.

During the lower half of its downward movement the pitch of each flap section 14 progressively decreases until it is at the same pitch as front section 12 at the bottom of its movement, designated 180° in Fig. 3.

It is further proposed to vary the pitch of each flap section 14 as it rotates upwardly, but the pitch will be changed reversely to the change during downward movement so as to decrease the pitch of each flap section relative to front section 12. During the first half of its upward rotative movement the pitch of each flap section 14 is progressively decreased and reaches a minimum pitch at or near horizontal position, designated 270° in Fig. 3. See Fig. 7. During the last half of its upward rotation the pitch of each flap section 14 is progressively increased until it reaches the same pitch as front section 12 at or near the top of its movement.

As has been explained the flap section of each blade progressively changes pitch during the course of rotation for landing descent and also for take-off ascent. The pitch of the flap sections of blades A, B and C will progressively change in relation with each other during the course of rotation. In Fig. 2 flap section 14 of blade A in horizontal position is shown at maximum pitch. Flap section 14 of blade B is in the first half of its upward movement from bottom position and is starting to decrease in pitch. Flap section 14 of blade C has passed horizontal position in its upward movement, at which it was at minimum pitch, and is again approaching the same pitch as front section 12.

The automatic pitch varying mechanism for changing the effective pitch of the blades A, B and C by changing the pitch of their flap sections 14 is associated with propeller shaft 11 and hub 10. A non-rotatable annular cam track member 20 is journaled by a hub socket comprising integral socket portion 21 and socket pieces 22 and 23, which are removably secured to track member 20 by bolts 24 and 25, on a rotatable annular knuckle 26 fixed to shaft 11 in rearward spaced relation to hub 10. See Figs. 12, 13, 14, 15, 16 and 17. In normal flight track member 20 will be perpendicular to shaft 11. See Figs. 15 and 16. In such position it will be parallel to the plane of rotation of the propeller blades A, B and C. From such position track member 20 is adjustably tiltable on knuckle 26 about an upright axis, either vertical or inclined up to, say, 30 degrees from the vertical, being supported for such movement by means hereafter referred to. When tilted track member 20 is adapted to effect pitch variation of the blade flap sections 14.

The peripheral portion 27 of track member 20 is of hollow curved cross-section and has track surfaces 28 and 29 on which roller bearings 30 and 31 are adapted to ride variously, depending upon whether the track member is in non-tilted or tilted position. See Fig. 16.

Roller bearings 30 and 31 are mounted by journals 32 and 33 on the reduced outer end portion 34 of an arm 35. The inner end of such arm is pivotally mounted in bifurcated supporting element 36 secured to hub 10. See Figs. 16, 17 and 18. Pivotally connected to the outer end of arm 35 is the rear end of a further arm 37 which extends forwardly in outwardly spaced relation to the hub. Pivotally connected to the forward end of arm 37 is an actuating rod 38 adapted to be rigidly secured to one of the propeller flap sections 14. Also pivotally secured to the front end of arm 37 is the rear end of a further arm 39. Such arm extends forwardly in alignment with arm 37 and at its forward end is pivotally connected with the outer end of transverse arm 40 of a bellcrank. The bellcrank is pivotally mounted by bifurcated supporting element 41 on the front end of hub 10. These various parts merely rotate with hub 10 when cam track member 20 is in non-tilted position. When the latter member is tilted, as in Figs. 12, 13 and 15, such parts under actuation of roller bearings 30 and 31 riding in peripheral portion 27 have a forward and backward movement to change the pitch of one of the propeller blade flap sections 14.

Centrifugally responsive means is provided to stabilize the variable pitch propeller mechanism against vibration just described under rotation of the mechanism and the air force acting on each flap section 14. Pivotally supported in a bifurcated supporting element 42 on the forward end of the hub diametrically opposite supporting element 41 is a forwardly extending arm 43. To the forward end of arm 43 is secured a relatively heavy metal ball 44 or equivalent weight element adapted to be urged laterally outward on arm 43 by centrifugal force under rotation of the hub. Located forwardly of the hub is a transverse arm 45 pivotally connected at one end to an intermediate portion of arm 43 and similarly connected at its other end to the forwardly extending arm 46 of the bellcrank. The centrifugal force developed by ball 44 through arms 45 and bellcrank arm 46 constantly urges bellcrank arm 40, arms 39, 37 and 35 and actuating rod 38 in a forward direction. Such arms and flap 14 are thus maintained against vibration and roller bearings 30 and 31 are maintained in proper engagement with peripheral portion 27 of track member 20.

The pitch bearing mechanism just described is shown in Figs. 12 and 13 in connection with flap section 14 of propeller blade A. Similar separate actuating mechanism duplicating the parts shown in Fig. 18 is provided for actuating the flap sections of blades B and C. Such parts appear in Figs. 12, 13 and 14 as 35*b*, 37*b*, 38*b*, 39*b*, 40*b*, 43*b*, 44*b*, 45*b* and 46*b* for actuating flap section 14 of propeller blade B. Corresponding parts 35*c*, 37*c*, 38*c*, 39*c*, 40*c*, 43*c*, 44*c*, 45*c* and 46*c* appear for actuating flap section 14 of propeller blade C.

With cam track member 20 tilted as shown in Figs. 12 and 13 rotation of the propeller on hub 10 causes the parts of the flap actuating mechanism to rotate about the track member and to progressively increase and decrease the pitch of each flap section on downward movement of each blade and progressively decrease and then progressively increase the pitch of the flap section of each blade on upward movement thereof, as heretofore explained in connection with Figs. 3 to 7. In the course of rotation the centrifugal balls 44, 44b, and 44c swing laterally inwardly and outwardly to correspondingly affect the flap actuating mechanism for each flap section and maintain a constant tension on the parts of such mechanism under centrifugal force. The amount of change in pitch of the flap sections will depend upon the amount of tilt of track member 20. For the arrangement of parts shown maximum pitch will be effected when track member 20 is tilted approximately 15° on its upright axis relative to propeller shaft 11. If found necessary the various flap sections 14 may be provided with indentations 48 to clear peripheral portion 27 of track member 20 when in the extreme tilted position. A domed hollow cap 49 of sufficiently large diameter to house and protect the parts of the pitch changing mechanism is secured to the propeller blades in outward spaced relation to hub 10 as shown in Fig. 12.

The pitch varying mechanism is brought into operation during landing descent and take-off ascent by tilting of cam track member 20. This is accomplished manually by the aircraft pilot. One control means for this purpose is shown in Figs. 19, 20 and 21. Mounted on a vertical panel 50 in the pilot's compartment in an aircraft is a pivoted manually operated arm 51 having a detent 52 adapted to releaseable locking engagement with notches in an arcuate notched blade 53 adapted to retain control arm 51 in any adjusted position. Pivotally secured to the lower end of arm 51 is an adjusting rod 54 which extends outwardly through the aircraft wing to a bellcrank 55. Such bellcrank is supported by a bifurcated supporting element 56 secured to a rigid section interiorly of the aircraft wing. Mounted in the forward edge of the aircraft wing is a bushing 58. Connecting with bellcrank 55 is a further actuating rod 57 which extends outwardly through the bushing and pivotally connects with a bifurcated supporting element 66 on track member 20. See Fig. 19. Bushing 58 should have a hollow rectangular slot adapted to closely embrace the opposite sides of actuating rod 57 and prevent rotation of track member 20. Such slot, not shown, should have sufficient width to accommodate limited tilting movement of rod 57. By swinging control arm 51 to the left as seen in Figs. 19 and 21 the pilot can set track member 20 to any degree of tilt to produce the desired change in pitch of the propeller blade flap sections 14 in either descent or ascent. Swinging arm 51 to the right from any tilted position of track member 20 will cause the track member to assume its inoperative position perpendicular to propeller shaft 11 for horizontal flight. Of course the track member must be held against rotation in all its adjusted positions. Any suitable bracing therefore for such purpose may be provided in conjunction with the mounting wing. Also, it will ordinarily be desirable to provide any suitable mounting for the track member which will pivotally support the member itself or its hub for its tilting movement about a fixed upright axis, perpendicular or inclined. Such details will be obvious to any one skilled in the aircraft art and have not been illustrated for such reason.

The variable pitch propeller mechanism which has been described should be mounted in reversely rotating pairs, two pairs or more, on opposite sides of an aircraft. In Figs. 8 and 9 is shown an aircraft having a body 59 and wings 60 and 61. The propeller with blades A, B and C and the actuating mechanism heretofore described is shown as mounted on the outer end of right wing 60 in conjunction with a propeller driving engine 62. A similar propeller having blades A', B' and C' reversely driven by a second engine 63 is mounted at the outer end of the left wing 61. The aircraft shown is merely exemplary. However, it is desirable for best results of the variable pitch propeller mechanisms that the engine and propeller units should be located in the region of the longitudinal center of the gravity of the aircraft. A second manually adjustable pitch adjusting mechanism similar to that shown in Figs. 19 to 21 will be provided for the actuating mechanism for propeller blades A', B' and C' on wing 61. The pitch changing mechanism for such blades will be similar to that described except that the actuating parts will be mounted in reverse relation around the hub because of the different direction of rotation of the second propeller. Also the track member will have tilting movement about its upright axis opposite to that of track member 20.

As heretofore explained, the essential purpose of increasing the pitch of the propeller blades during the downward rotation is to secure a substantial downward thrust of air by the variable pitch flap sections in addition to the forward thrust obtained by the forward blade sections. The effect of the downward thrust of air gives a lifting effect to the blades in their downward motion which supplements the lift of the aircraft wings. The forward speed of the aircraft either during ascent or descent is substantially lower than with conventional variable pitch propeller mechanisms. This is compensated by the lift effect on the blades. Whereas with ordinary variable pitch mechanism and wing flaps the forward speed during landing descent is ordinarily not lower than one-quarter the top speed in horizontal flight, the present arrangement permits landing descent at speeds which may range down to as low as one-tenth of top horizontal flying speed.

The decrease in pitch of the propeller blade flap sections below the pitch of the front sections provides a feathering action which decreases the air resistance on the blades during their upward movement. This counterbalances the increased load on the blades during their downward motion. Preferably the decrease in pitch of the flap sections on upward movement below normal pitch represented by the pitch of the front sections is the same in amount, measured in degrees, as the increase of pitch above normal pitch of the flap sections on their downward movement. By way of example, it has heretofore been suggested that if the normal pitch of the blades is 45° the increase in pitch on downward movement of the flap sections may be within a range of 30° higher and that the decrease in pitch of the blades on their upward movement be within a range of 30° lower than normal pitch. While the change in pitch is automatically accomplished the changes in pitch to suit any conditions of descent or ascent are manually adjustable by the pilot.

If the tiltable track mechanism 20 is mounted for rotation upon a vertical axis the progressive change in pitch of the propeller blade flap sections will be as previously explained in conjunction with Fig. 3 and Figs. 4 through 7. Because the air is fluid and is given a swirling motion by the blades as well as motion in a rearward direction it may be found desirable to advance the timing of the pitch changing cycle. This may be accomplished by mounting the track sections of the actuating mechanism for tilting movement about an inclined axis. The angular advance in timing may range upwardly to, say, 30°. Assuming such a condition the propeller flaps would be at normal pitch in alignment with the front blade sections at 330° on the rotational diagram of Fig. 3. The pitch would progressively increase therefrom and reach a maximum at 45°. From such position the propeller flaps would progressively decrease to reach normal position at 150°. From such position the pitch of the flap sections would progressively decrease to a minimum at 240° and therefrom progressively increase in pitch to reach normal pitch again at 330°. These figures are merely illustrative and may be subject to considerable variation depending upon propeller size and shape, engine power and rotational speed and the size and weight of the aircraft.

It will also be understood that the particular construction of the propeller blades and the variable pitch mechanism therefor as have been illustrated and described are merely illustrative and are capable of considerable variation and equivalency within the scope of the invention, which is to be determined in accordance with the appended claims.

I claim:

1. Variable pitch propeller mechanism comprising a propeller rotatable about an axis parallel to the line of flight and having variable pitch propeller blades, each blade comprising a fixed pitch blade section and a variable pitch blade section, and automatic mechanism operable during downward rotation of the blades to increase the pitch of the variable pitch blade sections above their normal pitch and operable during upward rotation of the blades to decrease the pitch of the variable pitch blade sections below the normal pitch, further including centrifugally responsive means rotatable with the blades and exerting centrifugally developed forces on the variable pitch blade sections during increased and decreased pitch changes of the variable pitch blade sections by the automatic pitch changing mechanism.

2. Variable pitch propeller mechanism comprising a propeller rotatable about an axis parallel to the line of flight and having front blade sections and rear flap blade sections hinged to the front blade sections for change in pitch relative to the front sections, individual means for changing the pitch of the flap blade section relative to the front blade section of each blade of the propeller and common means for actuating said individual means to progressively increase and progressively decrease the pitch of the flap blade sections relative to the front blade sections during downward blade rotation and for actuating said individual means to progressively decrease and progressively increase the pitch of the flap blade sections relative to the front blade sections during upward blade rotation, further including centrifugally responsive means for each propeller blade operative to exert centrifugally developed forces on each flap blade section and its individual pitch changing means during pitch changing operations.

3. In a device for diminishing vibration of a propeller blade element having constantly varying pitch during the course of rotation, a weight pivotally mounted and rotative with said blade element so as to move away from the axis of rotation of said blade element by virtue of centrifugal force as said blade element rotates, a linkage mechanism connected with said blade element and operable to oscillate said blade element for effecting cyclically varying pitch, and means connecting said weight with said linkage mechanism to exert a steadying influence of positive thrust on said blade element by virtue of the centrifugal force acting on said weight.

4. Variable pitch propeller mechanism comprising a propeller rotatable about an axis parallel to the line of flight and having front blade sections and rear flap blade sections hinged to the front blade sections for change in pitch relative to the front sections, individual means for changing the pitch of the flap blade section relative to the front blade section of each blade of the propeller and common means for actuating said individual means to progressively increase and progressively decrease the pitch of the flap blade sections relative to the front blade sections during downward blade rotation and for actuating said individual means to progressively decrease and progressively increase the pitch of the flap blade sections relative to the front blade sections during upward blade rotation, said individual means being rotatable with the propeller blades and having forward and backward movement relative to the front blade section, and the common actuating means comprising a normally stationary member extending transversely of the propeller axis and tilted about an upright axis, and further including manually controlled means for varying the tilt of said member relative to the propeller axis and for bringing said member into parallel relation with the plane of rotation of the propeller blades, said mechanism including centrifugally responsive means applying centrifugally developed forces to the individual means and to the flap blade sections during rotation.

5. Variable pitch propeller mechanism comprising a propeller rotatable about an axis parallel to the line of flight and having front blade sections and rear flap blade sections hinged to the front blade sections, for change in pitch relative to the front sections, plus a rotary hub mounting the sectional propeller blades for rotation about the transverse axis, a circular normally stationary actuating member surrounding the transverse axis and mounted independently of the hub for variable tilting movement about an upright axis, means mounted on the hub for rotation and forward and backward movement and actuable by said circular actuating member to progressively increase and decrease the pitch of the flap blade sections relative to the front blade sections during rotation, and manually controlled means for adjusting the tilt of the circular actuating means about its upright axis, said mechanism including weight members mounted on the hub for lateral movement thereon and applying centrifugally developed forces to the forwardly and backwardly movable members and to the flap blade sections during rotation.

References Cited in the file of this patent

UNITED STATES PATENTS

| | | |
|---|---|---|
| 1,325,696 | Lightburne | Dec. 23, 1919 |
| 1,419,877 | Martel | June 13, 1922 |
| 1,924,192 | Kusse | Aug. 29, 1933 |
| 2,023,760 | Dornier | Dec. 10, 1935 |
| 2,039,628 | Brown | May 5, 1936 |
| 2,489,343 | Wasserman et al. | Nov. 29, 1949 |
| 2,510,006 | Young | May 30, 1950 |